US012340923B2

(12) United States Patent
Bhatt et al.

(10) Patent No.: US 12,340,923 B2
(45) Date of Patent: Jun. 24, 2025

(54) INTERMITTENT TAPE

(71) Applicant: Sterlite Technologies Limited, Gurugram (IN)

(72) Inventors: Darshana Bhatt, Gurugram (IN); Gourav Kumar, Gurugram (IN)

(*) Notice: Subject to any disclaimer, the term of this patent is extended or adjusted under 35 U.S.C. 154(b) by 0 days.

(21) Appl. No.: 17/705,243

(22) Filed: Mar. 25, 2022

(65) Prior Publication Data

US 2023/0230718 A1 Jul. 20, 2023

(51) Int. Cl.
*H01B 11/06* (2006.01)
*H01B 5/14* (2006.01)
*H01B 11/18* (2006.01)

(52) U.S. Cl.
CPC ............ *H01B 5/14* (2013.01); *H01B 11/1869* (2013.01)

(58) Field of Classification Search
CPC ........................................................ H01B 11/06
See application file for complete search history.

(56) References Cited

U.S. PATENT DOCUMENTS 9,196,398 B2 * 11/2015 Kroushl ................. H01B 11/04
9,275,776 B1 * 3/2016 McNut ................... H01B 11/06
9,928,943 B1 * 3/2018 McNutt .............. H01B 11/1016
10,186,350 B2 * 1/2019 Kusuma ............... H01B 7/0216
10,388,435 B2 * 8/2019 Wachtel ................. H01B 11/08
10,515,744 B1 * 12/2019 Good ...................... H01B 11/08
10,517,198 B1 * 12/2019 Brown ................... H01B 7/226
11,664,134 B2 * 5/2023 Sakaida ................... H01B 5/02 174/126.2
2006/0048961 A1 * 3/2006 Pfeiler ................. H01B 11/085 174/36
2007/0037419 A1 * 2/2007 Sparrowhawk .... H01B 11/1008 439/98

* cited by examiner

*Primary Examiner* — Chau N Nguyen
(74) *Attorney, Agent, or Firm* — Steven R. Fairchild; Michael J. Pennington

(57) ABSTRACT

The present disclosure provides an intermittent tape (100) disposed of around a pair of conductors. The intermittent tape (100) has a top dielectric layer (102), a bottom dielectric layer (106) and a conductive layer (104). The conductive layer (104) is sandwiched between the top dielectric layer (102) and the bottom dielectric layer (106). The conductive layer (104) includes conductive segments (108) and non-conductive segments (110). The non-conductive segments (110) are defined by an absence of the conductive segments (108). The conductive segments (108) and the non-conductive segments (110) are arranged alternatingly. A width of the non-conductive segments (110) between the conductive segments (108) is constant.

6 Claims, 5 Drawing Sheets

INTERMITTENT TAPE

TECHNICAL FIELD

The present disclosure relates to the field of telecommunications cables and, more particularly, to an intermittent tape for telecommunications cables. The present application claims the benefit of Indian Application No. 202111057136 filed 30 Dec. 2021.

BACKGROUND

In a telecommunications cable, data propagates via twisted pair conductors. A conventional twisted pair conductor generally includes two insulated conductors twisted together along a longitudinal axis of the telecommunications cable. The performance of the telecommunications cable having twisted pair conductors is evaluated utilizing parameters like, impedance, dimensional properties, attenuation, crosstalk or the like. Crosstalk is an important parameter that needs to be considered while designing the telecommunications cable. The twisted pair conductors emit electromagnetic fields around them. These electromagnetic fields often regard as noise or interference. These electromagnetic fields adversely affect signals carried by adjacent twisted pair conductors that may result in crosstalk. The crosstalk interferences are of different types and one of them is alien crosstalk interference. Alien crosstalk interference is a measure of signal coupling between the conductors of the twisted pair of different telecommunications cables. A signal on a twisted pair conductor of a first cable may be affected by alien crosstalk interference emanated from the twisted pair conductors of a second cable that is placed in the proximity of the first cable.

One of the current solutions to mitigate the problems of alien crosstalk is to provide sufficient space between a core and a jacket of the telecommunications cable. The space between the core and the jacket compensates the alien crosstalk effect from a neighboring cable. Hence, it is imperative to have the conventional telecommunications cables made with bigger diameter for improving the alien crosstalk. Moreover, currently the telecommunications cable has the capability of Power over Ethernet (PoE). Such telecommunications cable supplies power along with the data. During its application, the PoE telecommunications cable gets heated up. The conventional PoE telecommunications cables design is not enough to transfer heat effectively and thus, may deteriorate the performance of the telecommunications cable.

Another currently available solution to mitigate the issues of alien crosstalk is to place a conductive tape or foil as a shield encapsulating the core of the telecommunications cable. The conductive tape or foil provides shield from alien crosstalk from the neighbouring cable. The conductive tape or foil is continuous throughout the longitudinal length of the telecommunications cable. Such solutions surely are better than aforementioned solutions that have no shielding tape available in the telecommunications cable. However, there are lot of shortcomings associated with the telecommunications cable utilising such continuous conductive tape or foil. For example, there are manufacturing complexities involved to develop the telecommunications cable having the continuous tape or shield. Moreover, as the continuous nature of the conductive tape or foil includes higher percentage of a conductive portion, it leads to bulkiness and higher cost. The continuous conductive tape or shield carries voltage that makes the telecommunications cable with the conductive tape or shield hazardous in handling and hence, require proper grounding. To mitigate the issues of the continuous tape, a discontinuous tape solution has been developed for the telecommunications cable. The discontinuous tape includes two portions i.e. a conductive portion and a dielectric portion. However, in the telecommunications cable employed with the discontinuous tape, the percentage of the conductive portion of the discontinuous tape is much higher, which makes the cable heavy.

There are a few patent applications which provide an intermittent tape disposed of around a pair of conductors. In an example, the patent U.S. Pat. No. 10,517,198B1 discloses a cable having shielding tape with conductive shielding segments. n another example, the patent U.S. Pat. No. 9,196,398B2 discloses discontinuous shielding tapes for data communication cable. In yet another example, the patent U.S. Pat. No. 8,558,115B2 discloses a communication cable including a mosaic tape. In yet another example, the patent U.S. Pat. No. 9,196,398B2 discloses discontinuous shielding tapes for data communications cable.

In the light of the above stated discussion, there is a need to ameliorate one or more of the aforementioned disadvantages by providing an intermittent tape disposed of around a pair of conductors.

Object of the Disclosure

A primary objective of the present disclosure is to provide an intermittent tape for a telecommunications cable. The intermittent tape has discontinuous conductive regions defined by shapes of same or different sizes.

Another objective of the present disclosure is to provide the telecommunications cable employing the intermittent tape.

Another objective of the present disclosure is to provide the telecommunications cable having a higher margin of alien crosstalk, a better PoE performance and an excellent return loss margins.

Yet another objective of the present disclosure is to provide a low diameter and easy to install telecommunications cable.

SUMMARY

In an aspect, the present disclosure provides an intermittent tape disposed of around a pair of conductors. The intermittent tape has a top dielectric layer, a bottom dielectric layer and a conductive layer. The conductive layer is sandwiched between the top dielectric layer and the bottom dielectric layer. The conductive layer includes conductive segments and non• conductive segments. The non-conductive segments are defined by an absence of the conductive segments. The conductive segments and the non-conductive segments are arranged alternatingly. A width of the non-conductive segments between the conductive segments is constant.

Statement of the Disclosure

The present disclosure provides an intermittent tape disposed of around a pair of conductors. The intermittent tape has a top dielectric layer, a bottom dielectric layer and a conductive layer. The conductive layer is sandwiched between the top dielectric layer and the bottom dielectric layer. The conductive layer includes conductive segments and non-conductive segments. The non-conductive segments are defined by an absence of the conductive segments.

The conductive segments and the non-conductive segments are arranged alternatingly. A width of the non-conductive segments between the conductive segments is constant.

BRIEF DESCRIPTION OF THE FIGURES

Figure 1:
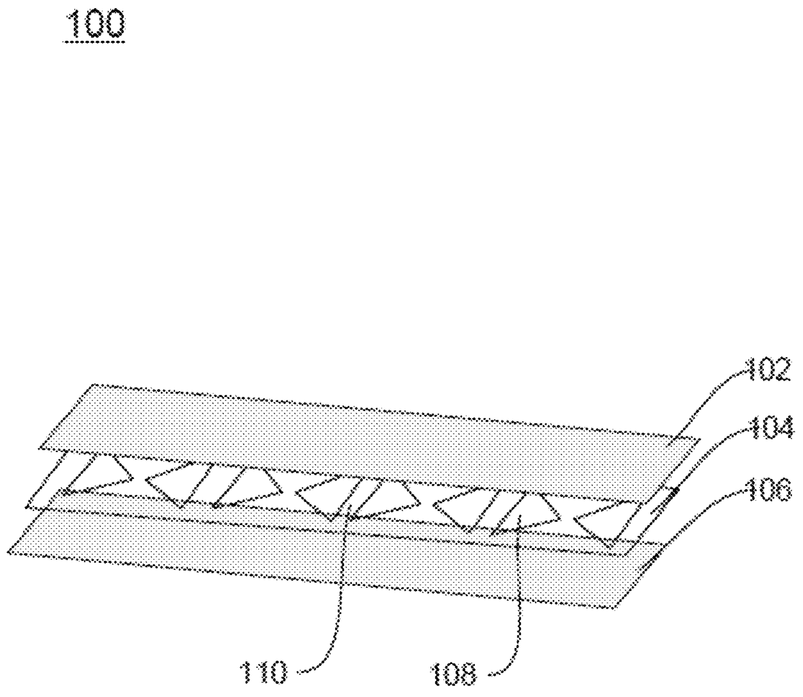
Figure 2:
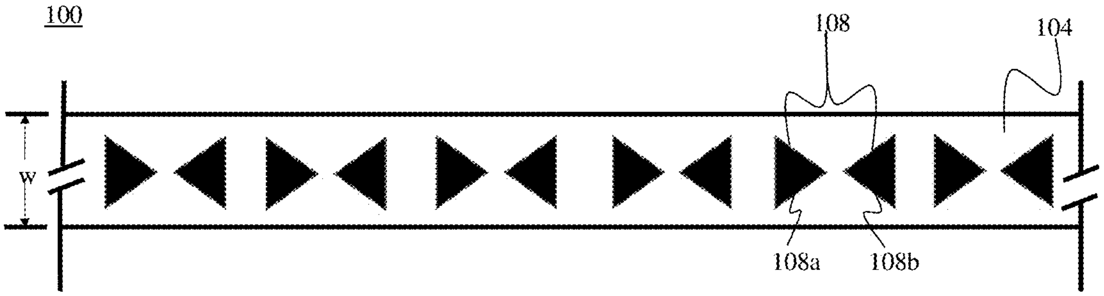
Figure 3:
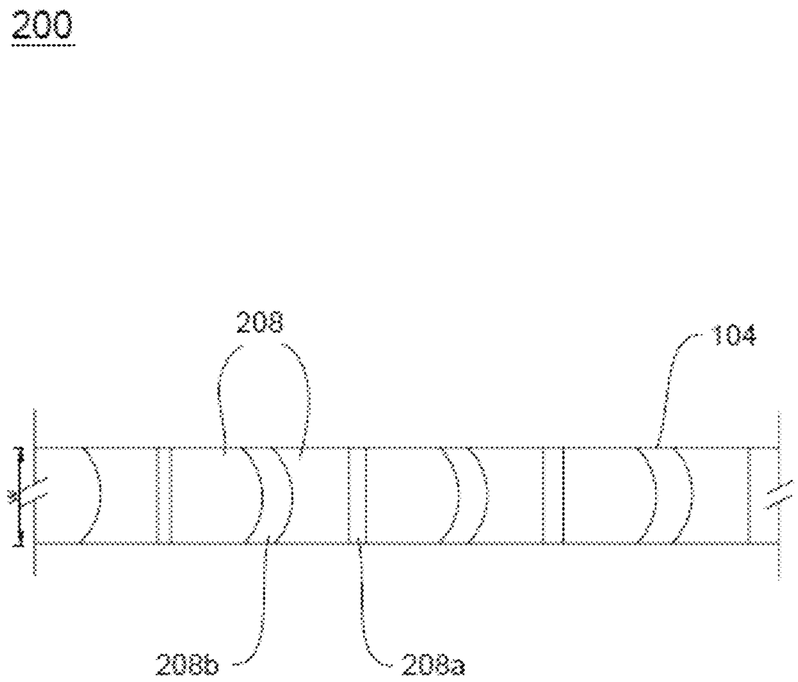
Figure 4:
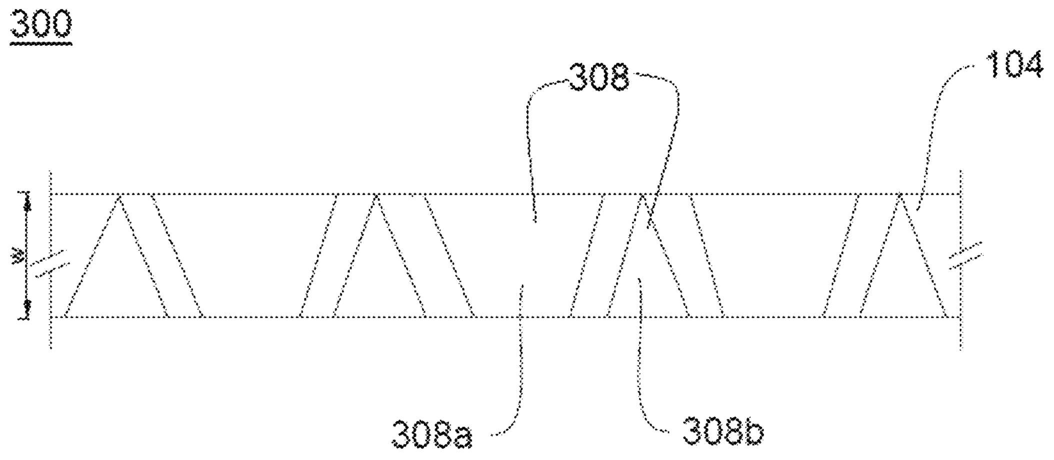
Figure 5:
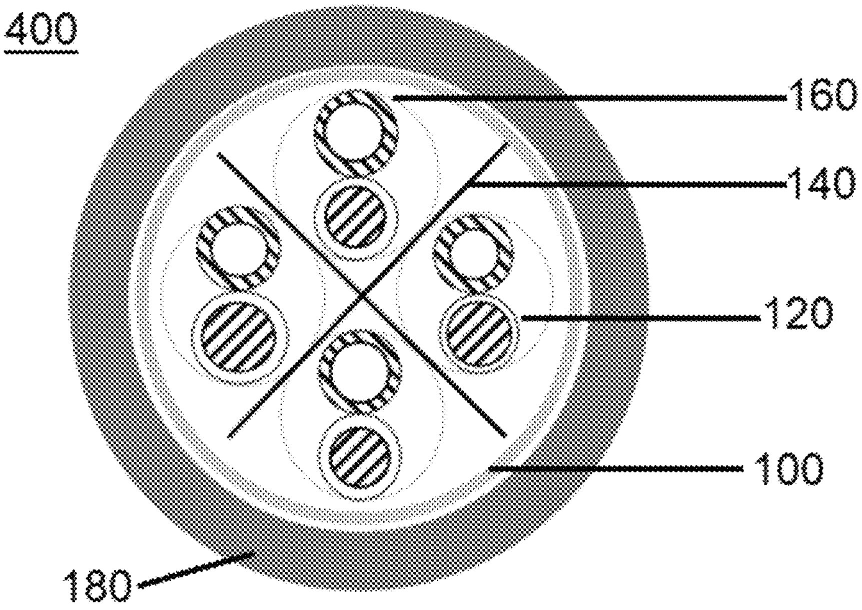

Having thus described the invention in general terms, reference will now be made to the accompanying drawings, which are not necessarily drawn to scale, and wherein:

FIG. 1 illustrates an intermittent tape design for a telecommunications cable, in accordance with an aspect of the present disclosure;

FIG. 2 illustrates the intermittent tape in a first configuration for the telecommunications cable, in accordance with an aspect of the present disclosure;

FIG. 3 illustrates the intermittent tape in a second configuration for the telecommunications cable, in accordance with another aspect of the present disclosure; and FIG. 4 illustrates the intermittent tape in a third configuration for the telecommunications cable, in accordance with yet another aspect of the present disclosure and FIG. 5 illustrates a telecommunications table 400 comprising an unshielded twister pair with the tape 100, disposed around a pair of conductors.

It should be noted that the accompanying figures are intended to present illustrations of exemplary depictions of the present disclosure. These figures are not intended to limit the scope of the present disclosure. It should also be noted that accompanying figures are not necessarily drawn to scale.

DETAILED DESCRIPTION

Reference in this specification to "one aspect" means that a particular feature, structure, or characteristic described in connection with the aspects included in at least one aspect of the present technology. The appearance of the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but no other aspects.

Reference will now be made in detail to selected aspects of the present disclosure in conjunction with accompanying figures. The aspects described herein are not intended to limit the scope of the disclosure, and the present disclosure should not be construed as limited to the aspects described. This disclosure may be embodied in different forms without departing from the scope and spirit of the disclosure. It should be understood that the accompanying figures are intended and provided to illustrate aspects of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an intermittent tape 100 design for a telecommunications cable, in accordance with an aspect of the present disclosure. The intermittent tape 100 is disposed around a pair of conductors of the telecommunications cable. The intermittent tape 100 enables the telecommunications cable to have no grounding requirements, a higher margin of alien crosstalk and a better return loss performance. The intermittent tape 100 enables to achieve the required alien cross talk margin with respect to TIA standard at a given frequency range (i.e., 500 MHz).

In general, the telecommunications cable is a type of guided transmission media that allows baseband transmissions from a transmitter to a receiver. In addition, the telecommunications cable is utilized for mass data transmission of local area network. Moreover, the telecommunications cable is used for high speed data rate transmission. The high speed data rate transmission includes 1000BASE-T (Gigabit Ethernet) and 10 GBASE-T (10-Gigabit Ethernet) or other standards.

The telecommunications cable 400 (illustrated in FIG. 5) is an unshielded twisted pair telecommunication cable. In general, the unshielded twisted pair telecommunication cable is a cable with two conductors of a single circuit twisted together. The electrical conductors are twisted together for the purposes of cancelling out electromagnetic interference from internal and external sources. In an aspect of the present disclosure, the telecommunications cable 400 deployed with the intermittent tape 100 includes a core having at least two twisted pairs of conductors 120, a separator 140 separating at least two twisted pairs of conductors 120, a dielectric tape 160 and a jacket 180 surrounding the core. The telecommunications cable 400 may be a Category 6A U/UTP (Unshielded Twisted Pair) cable. The telecommunications cable 400 implemented with the proposed intermittent tape 100 may be of Category 6A U/UTP category and is a 100 meter compliance cable. Alternatively, the telecommunications cable 400 may be of any other category. The intermittent tape 100 encapsulates the core and the jacket 180 encapsulates the core wrapped with intermittent tape 100.

The intermittent tape 100 includes a top dielectric layer 102, a bottom dielectric layer 106 and a conductive layer 104. The top dielectric layer 102 and the bottom dielectric layer 106 enable no flow of current. The conductive layer 104 is sandwiched between the top dielectric layer 102 and the bottom dielectric layer 106. The conductive layer 104 includes conductive segments 108 and non-conductive segments 110. The non-conductive segments 110 are defined by an absence of the conductive segments 108. The conductive segments 108 and the non-conductive segments 110 are arranged alternatingly. A width of the non. conductive segments 110 between the conductive segments 108 is constant.

The conductive segments 108 are discontinuous conductive segments placed consecutively and in a continuous manner along the length of the intermittent tape 100. In an aspect, the conductive layer 104 may be made of the conductive segments 108 sandwiched between the top dielectric layer 102 and the bottom dielectric layer 106 and in continuous manner along the length of the intermittent tape 100. In another aspect, the conductive layer 104 may have discontinuous semi-conductive segments placed consecutively and in continuous manner along the length of the intermittent tape 100.

The intermittent tape 100 has a width "w" of 18 to 30 mm. The discontinuous conductive segments are arranged and placed in various shapes on any one of the top dielectric layer 102 and the bottom dielectric layer 106 of the intermittent tape 100. If the discontinuous conductive segment is placed on the top dielectric layer 102, then the bottom dielectric layer 106 may be adhesively placed upon the discontinuous conductive segment of the top dielectric layer 102 forming a three layer tape. In an aspect, the discontinuous conductive segments may be engraved upon the top dielectric layer 102 forming a two layer tape while the bottom dielectric layer 106 may be used as a separate layer forming the three layer tape.

The discontinuous conductive segments are placed consecutively and in a continuous manner along a length of the intermittent tape 100. The discontinuous conductive segments are placed consecutively and continually with a distance between each of the discontinuous conductive segments. The distance between each of the discontinuous conductive segments on the conductive layer 104 may be equal. The discontinuous conductive segments may have a width equal to or less than the width of the intermittent tape 100. The discontinuous conductive segments may have the same shape and size and be placed consecutively and continually along the length of the intermittent tape 100. The discontinuous conductive segments may have different shapes and sizes and are placed consecutively and continually along the length of the intermittent tape 100. Alternatively, the discontinuous conductive segments may be replaced with discontinuous semi-conductive segments.

In an example, the top dielectric layer 102 and the bottom dielectric layer 106 may be constructed from dielectric materials that do not conduct electricity. Few examples of such materials are polyimide, polypropylene, polyethylene, polyester and the like. The discontinuous conductive segments are formed from conductive materials such as aluminium, silver, conductive metal alloy, copper, and the like. In an aspect, the intermittent tape 100 has the discontinuous semi-conductive segments and may be formed from semi-conductive materials such as germanium, silicon, graphene or the like.

In an aspect of the present disclosure, a ratio of the non-conductive segments 110 to the conductive segments 108 is less than equal to 1.92. If the value is less than 0.34 then, the intermittent tape 100 becomes costly and bulky. The ratio of the non-conductive segments 110 to the conductive segments 108 area is in a range of 0.34-1.92. The ratio in the provided range enables improvement in internal performance of the telecommunications cable with excellent alien cross talk margin.

In an aspect of the present disclosure, the ratio of the non-conductive segments 110 to the conductive segments 108 is greater than equal to 0.34. If the ratio increases above 1.92, then, the electromagnetic interferences increase which leads to increase the alien cross talk and thus, the alien cross talk requirement will not be met.

FIG. 2 illustrates the intermittent tape 100 in a first configuration for the telecommunications cable, in accordance with an aspect of the present disclosure. For simplification, the top dielectric layer 102 and the bottom dielectric layer 106 are not shown. The intermittent tape 100 in the first configuration includes the top dielectric layer 102 and the bottom dielectric layer 106 (not shown), and the conductive layer 104. The intermittent tape 100 has a width "W" of 18 to 30 mm.).

The conductive layer 104 of the intermittent tape 100 has the conductive segments 108. In an aspect, the conductive layer 104 of the intermittent tape 100 may have the discontinuous semi-conductive segments. The discontinuous conductive segments 108 are defined by a shape with a base and a size. The shape of the discontinuous conductive segments 108 may be a triangle, a pentagon, a heptagon, a nonagon, a closed polygon having odd sided shapes or the like. The discontinuous conductive segments 108 are placed consecutively and continually along the length of the intermittent tape 100. Each of the discontinuous conductive segments 108 is placed in the form of a shape arranged inverted to each other with the base of the shape of each of the discontinuous conductive segments 108 parallel to the width of the intermittent tape 100.

For example, as shown in FIG. 2, triangular discontinuous conductive segments 108 are placed adjacently and are continuous along the length of the intermittent tape 100. The discontinuous conductive segments 108 are placed in a form of a pair of two inverted shapes 108*a*, 108*b*. The pair of two inverted shapes 108*a*, 108*b* are arranged such that the each inverted shape 108*a*, 108*b* may have a spacing in a range of 0.20 mm to 5 mm. A distance between the consecutively placed discontinuous conductive segments 108 is in a range of 0.20 mm to 5 mm. The base of the triangular discontinuous conductive segments 108 is parallel to the width of the intermittent tape 100. A gap between two consecutive inverted shapes can be constant in a range of 0.20-5 mm or can be variable. The constant gap enables better capacitance unbalance.

The width of the discontinuous conductive segments 108 is less than the width of the intermittent tape 100. The conductive layer 104 of the intermittent tape 100 has at least 30 percent conductive portion in the form of discontinuous conductive portions with air gaps between them. The shape of the discontinuous conducive segments 108 on the intermittent tape 100 is constructed in such a way that the discontinuous conductive segments 108 occupy at least 30% portion of the conductive layer 104. The intermittent tape 100 has at least 30% conductive portion and at the most 70% non-conductive portion.

In an aspect of the present disclosure, the conductive segments 108 are inverted polygons and arranged such that one edge of the inverted polygon is parallel to the width of the intermittent tape 100. In an aspect, the polygon includes a triangle, trapezoid and rectangle. For example, the shape of the discontinuous conductive segments 108 may be a closed polygon having odd sided shapes with a height of the discontinuous conductive segments 108 adjusted to achieve at least 30% conductive portion while having a base of the closed polygon parallel to the width of the intermittent tape 100. The conductive segments 108 in inverted shapes enable improvement in return loss performance.

FIG. 3 illustrates the intermittent tape 200 in a second configuration for the telecommunications cable, in accordance with another aspect of the present disclosure. For simplification, the top dielectric layer 102 and the bottom dielectric layer 106 are not shown. The intermittent tape 200 in the second configuration includes the top dielectric layer 102 and the bottom dielectric layer 106 (not shown), and the conductive layer 104. The intermittent tape 200 has a width "W" of 18-30 mm.

The conductive layer 104 of the intermittent tape 200 has the conductive segments 208. In an aspect, the conductive layer 104 of the intermittent tape 200 may have the discontinuous conductive segments or may have semi-conductive segments. The discontinuous conductive segments 208 are defined by a shape with a base and a size. The discontinuous conductive segments 208 can be rectangle, square, triangle or any other possible shape.

In an aspect of the present disclosure, each conductive segment 208 has exactly one curved edge and an opposite straight edge parallel to the width of the intermittent tape 200. In an aspect, exactly one curved edge of a first conductive segment is followed by a mating curved edge of a first conductive segment, and an opposite straight edge of the first conductive segment is followed by a mating straight edge of a third conductive segment. In an aspect, a surface area of the conductive segment, calculated by considering 4 equally separated points from the base of the conductive segments 108 across the edge of conductive segments 208 first decreases to a certain portion of the conductive segment and then increases. The change in the surface area of the conductive segments 208 produces extra eddy currents in the intermittent tape 200. The extra eddy currents reduce the alien cross talk in the telecommunications cable.

The intermittent tape 200 has a conductive discontinuity in the form of concave and convex shapes (as shown in FIG. 3) placed adjacent to each other. The conductive discontinuity is shaped like concave and convex placed adjacent to one another. The gap formed between the two conductive segments 208 is constant throughout the length of the intermittent tape 200 of the telecommunications cable. The concave shape enables higher margin of alien cross talk.

In an example, as shown in FIG. 3, the conductive layer 104 has equally separated discontinuous conductive segments 208 distributed consecutively and continually along a length of the intermittent tape 200. The discontinuous conductive segments 208 have discontinuity in the form of curved path. As shown in FIG. 3, adjacent discontinuous conductive segments 108 are separated by spacing **208*a* and the discontinuous conductive segments 108 has discontinuity 208*b* in a form of curved path. The discontinuous conductive segments 208 are formed such that a space between them is equal and in the range of 0.20 mm to 5 mm. Further, the discontinuity 208*b* in the conductive segments 208 is in the form of curved path and will form equal breaks of 0.20 mm to 5 mm along the length of the intermittent tape 200. The width of the discontinuous conductive segments 208 may be equal or less than the width of the intermittent tape 200**. Such width enables better capacitance unbalance.

FIG. 4 illustrates the intermittent tape 300 in a third configuration for the telecommunications cable, in accordance with yet another aspect of the present disclosure. For simplification, the top dielectric layer 102 and the bottom dielectric layer 106 are not shown. The intermittent tape 300 in the third configuration includes the top dielectric layer 102 and the bottom dielectric layer 106 (not shown), and the conductive layer 104. The intermittent tape 300 has a width "W" of 18-30 mm.}. The conductive layer 104 of the intermittent tape 300 has the conductive segments 308. In an aspect, the conductive layer 104 of the intermittent tape 300 may have the discontinuous conductive segments or may have semi-conductive segments. The discontinuous conductive segments 108 are defined by a shape with a base and a size.

The intermittent tape 300 has a conductive discontinuity shaped like triangle and trapezoid placed adjacent to each other. In an aspect, the conductive segments 308 are in a combination of triangle and trapezoid arranged alternatively (as shown in FIG. 3). In an example, as shown in FIG. 4, the discontinuous conductive segments 308 are of a triangular shape and a trapezoidal shape placed adjacent to each other continually along the length of the intermittent tape. The discontinuous conductive segments 308 are placed consecutively and continually with a distance between each of the discontinuous conductive segments 308 on the conductive layer 104. The distance between the consecutively placed discontinuous conductive segments 308 is equal along the length of the intermittent tape 300. The discontinuous conductive segments 308 are formed such that a space between them is equal and in the range of 0.20 mm to 5 mm. The discontinuous conducive segments 308 are arranged such that the distance between each consecutive conductive segment will be equal along the length of the intermittent tape 300. Also, the shape of the discontinuous conductive segments 308 e.g. a trapezoid **308*a* and a triangle 308*b* are selected in such a way that the trapezoid 308*a* and the triangle 308*b* will form equal spacing between them. The width of the discontinuous conductive segments 308 may be equal or less than the width of the intermittent tape 300**. The triangle and trapezoid shape enables higher margin of alien cross talk.

Considering, a line (i.e., x) parallel to the base of the conductive segments **308*a* or 308*b* and a line (i.e., z) perpendicular to the width of the conductive segments 308*a* or 308*b*. A rate of change of length in the conductive segment perpendicular to the length of the intermittent tape 300 makes the intermittent tape 300 aperiodic and the rate of change in length is denoted by dx/dz. In an example: the rate of change of length is −1 for the triangle conductive segments 308*b* and 0.036 for the trapezoid conductive segments 308*a*. In the triangle and trapezoid arrangement, the change in length in the conductive segment when moving perpendicular to the length of the intermittent tape 300 is large such that when the intermittent tape 300** is applied helically around the twisted pair of conductors. This increases the aperiodicity in the given frequency band i.e., 500 MHz. Thereby, reducing the alien cross talk in the telecommunications cable.

In an aspect of the present disclosure, a conductive ratio is less than 0.80. The conductive ratio is defined as a ratio of an area of the conductive segments 308 to an area of the top dielectric layer 102. In an aspect, the gap between the conductive segments 308 is less than equal 2.5 mm. If the gap is more than 2.5 mm, then, there are very low chances to meet the alien cross talk requirements in accordance to the standard at a given frequency i.e., 500 MHz.

The telecommunications cable deployed with the intermittent tape 100 exhibits important benefits over the prior arts. As the jacket tightly surrounds the core, the overall diameter of the telecommunications cable is reduced as there is no need to keep space between the core and the jacket to mitigate the issue of the alien crosstalk. As the intermittent tape 100 has discontinuous conductive segments 108, the telecommunications cable exhibits the higher margin of alien crosstalk and the better PoE performance. The telecommunications cable has improved internal performance at different frequency ranges. The telecommunications cable is of light weight as overall conductive portion of the cable is reduced. Due to the variety of the shapes of the discontinuous conductive segments 108, interference signals get reflected at many different points along the length of the telecommunications cable, hence enabling the telecommunications cable to have enhanced return loss performance. The intermittent tape 100 is implemented with three layer design enabling the telecommunications cable to have no grounding requirements and hence is safe for handling, easy to install and maintain. Moreover, the width of the discontinuous conductive segments 108 is less than that of the width of the intermittent tape 100. This enables the telecommunications cable to reduce its capacitance unbalance.

The foregoing descriptions of pre-defined aspects of the present technology have been presented for purposes of illustration and description. They are not intended to be exhaustive or to limit the present technology to the precise forms disclosed, and obviously many modifications and variations are possible in light of the above teaching. The aspects were chosen and described in order to best explain the principles of the present technology and its practical application, to thereby enable others skilled in the art to best utilize the present technology and various aspects with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. An intermittent tape (100) disposed of around a pair of conductors, wherein the intermittent tape (100) has a top dielectric layer (102);

a bottom dielectric layer (106);

a conductive layer (104) sandwiched between the top dielectric layer (102) and the bottom dielectric layer (106), wherein the conductive layer (104) comprises conductive segments (108) and non-conductive segments (110), wherein the conductive segments (108) and the non-conductive segments (110) are arranged alternatingly, wherein a first conductive segment of the conductive segments (108) is different from a second conductive segment of the conductive segments (108), wherein a width of the non-conductive segments (110) between the conductive segments (108) is constant, wherein a conductive ratio is less than 0.8, wherein the conductive ratio is defined as a ratio of an area of the conductive segments (108) to an area of the top dielectric layer (102) wherein the conductive segments (108) are in a combination of triangle and trapezoid arranged alternatively.

2. An intermittent tape (100) as claimed in claim 1, wherein a ratio of the non-conductive segments (110) to the conductive segments (108) is less than or equal to 1.5.

3. An intermittent tape (100) as claimed in claim 1, wherein the conductive segments (108) are inverted polygons and arranged such that one edge of the inverted polygons is parallel to a width of the intermittent tape (100).

4. An intermittent tape (100) as claimed in claim 3, wherein the inverted polygons comprise triangle, trapezoid and rectangle.

5. An intermittent tape (100) as claimed in claim 1, wherein each of the conductive segments (108) has exactly one curved edge and an opposite straight edge parallel to a width of the intermittent tape (100).

6. An intermittent tape (100) as claimed in claim 5, wherein the exactly one curved edge of one of the conductive segments (108) is followed by a mating curved edge of an adjacent one of the conductive segments, and the opposite straight edge of the one conductive segment is followed by a mating straight edge of another adjacent one of the conductive segments.

* * * * *